(12) United States Patent
Villamayor

(10) Patent No.: US 7,086,320 B2
(45) Date of Patent: Aug. 8, 2006

(54) BRAKE BOOSTER WITH EMERGENCY BRAKE ASSIST FUNCTION

(75) Inventor: Ernesto Bravo Villamayor, Pamplona (ES)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/046,293

(22) Filed: Jan. 28, 2005

(65) Prior Publication Data

US 2005/0126385 A1 Jun. 16, 2005

Related U.S. Application Data

(63) Continuation of application No. PCT/EP03/08318, filed on Jul. 28, 2003.

(30) Foreign Application Priority Data

Jul. 30, 2002 (DE) .................... 102 34 693

(51) Int. Cl.
*B60T 13/10* (2006.01)
(52) U.S. Cl. ................. 91/369.2; 91/376 R
(58) Field of Classification Search .......... 91/369.2, 91/369.3, 367, 376 R
See application file for complete search history.

(56) References Cited

U.S. PATENT DOCUMENTS

| 6,422,124 | B1 | 7/2002 | Schonlau et al. |
| 6,467,390 | B1 | 10/2002 | Harth et al. |
| 6,691,602 | B1 * | 2/2004 | Harth et al. ............ 91/369.2 |
| 6,755,116 | B1 | 6/2004 | Tsubouchi et al. |
| 2002/0069751 | A1 | 6/2002 | Inoue et al. |

FOREIGN PATENT DOCUMENTS

| DE | 199 02 710 | 11/1999 |
| EP | 0 901 950 | 3/1999 |
| WO | 99/26826 | 6/1999 |
| WO | 01/32488 | 5/2001 |

OTHER PUBLICATIONS

Document Bibliography and Abstract for DE 199 02 710 http://v3.espacenet.com/textdoc?DB=EPODOC &IDX=DE19902710&F=0, printed Jan. 13, 2005.
Document Bibliography and Abstract for WO 99/26826 http://v3.espacenet.com/textdoc?DB=EPODOC &IDX=WO9926826&F=0, printed Jan. 13, 2005.
Document Bibliography and Abstract for WO 01/32488 http://v3.espacenet.com/textdoc?DB=EPODOC &IDX=WO0132488&F=0, printed Jan. 13, 2005.

* cited by examiner

*Primary Examiner*—Thomas E. Lazo
(74) *Attorney, Agent, or Firm*—MacMillan, Sobanski & Todd, LLC

(57) ABSTRACT

A brake booster, in particular for motor vehicles, having a control valve for controlling the boosting force generated by the brake booster. The control valve comprises a control valve housing, an input element, an output element and a thrust piece, which is disposed between the input element and the output element and acts upon the output element. The thrust piece in dependence upon a relative movement between the thrust piece and the control valve housing caused by the input element is supported releasably against the control valve housing by means of a coupling element biased by a spring. The spring and the coupling element are designed as an integral coupling component, which is fastened to the control valve housing.

10 Claims, 1 Drawing Sheet

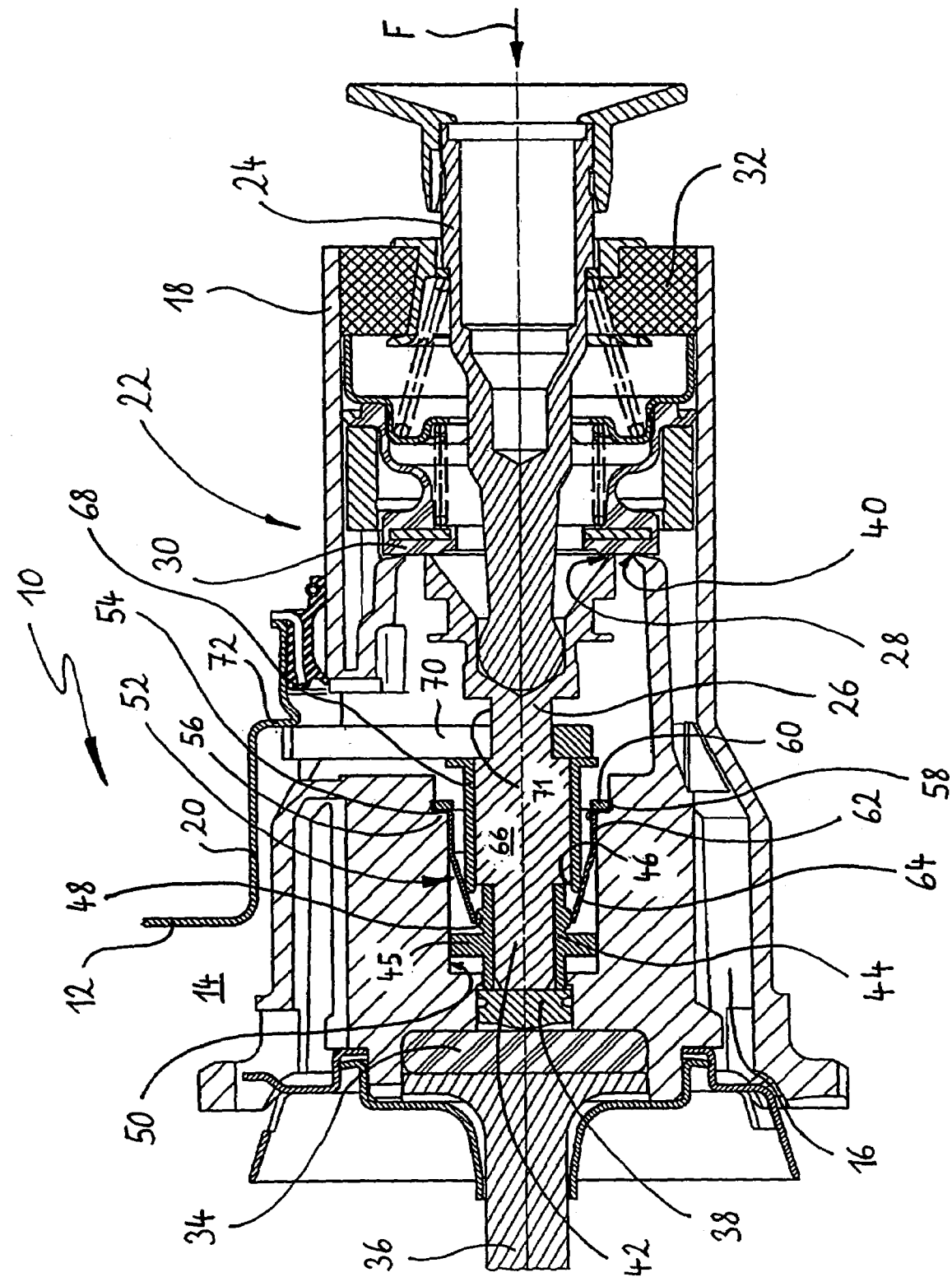

BRAKE BOOSTER WITH EMERGENCY BRAKE ASSIST FUNCTION

CROSS-REFERENCE TO RELATED APPLICATIONS

This application is a continuation of International Application No. PCT/EP03/08318 filed Jul. 28, 2003, the disclosures of which are incorporated herein by reference, and which claimed priority to German Patent Application No. 102 34 693.3 filed Jul. 30, 2002, the disclosures of which are incorporated herein by reference.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to brake boosters, in particular for motor vehicles, according to the preamble of claim 1, such as are known e.g. from WO 99/26826. Such brake boosters generally take the form of vacuum brake boosters and are used during braking to provide the driver of a vehicle with an auxiliary force so that the brake actuating force to be summoned up by the driver may be kept to a comfortable level. Purely hydraulically operating brake boosters are also known and the present invention is therefore not restricted to vacuum brake boosters.

2. Description of Related Art Including Information Described Under 37 CFR 1.97 and 1.98

Irrespective of the manner in which the auxiliary force is generated, e.g. by means of a vacuum or hydraulically, a brake booster usually has a control valve for controlling the boosting force it generates, i.e. the amount of auxiliary force, as well as a control valve housing. Extending at least partially into the control valve housing is an input element, with the aid of which a braking request of the driver is communicated to the brake booster. The input force, which is introduced via the input element into the brake booster, and the auxiliary force, which is subsequently generated by the brake booster, are combined at an output element and delivered by the output element to a master cylinder, connected downstream of the brake booster, of a vehicle hydraulic brake system. If the brake booster is a vacuum brake booster, the output element generally comprises a rubber-elastic material in disk form, which is disposed in a chamber in an end piece of the control valve housing and behaves like a liquid. Situated between the output element and the input element is a thrust piece, which is movable axially relative to the control valve housing. The actuating force introduced into a brake booster therefore flows via the input element and from there, optionally via interposed components such as valve pistons or the like, to the thrust piece and then to the output element.

It has already been known for some time that most drivers of a motor vehicle in an emergency braking situation do not actuate the brake strongly enough. This behaviour is disadvantageous particularly if the vehicle brake system is equipped with an anti-skid system, because the maximum braking action of a brake system equipped with an anti-skid system may be achieved only when each vehicle wheel during braking enters a slip-controlled state, i.e. when each vehicle wheel is braked to such an extent that the slip control of the anti-skid system is activated. This state is reached only when a sufficiently high hydraulic actuating pressure is supplied to each vehicle wheel, this in practice frequently not being the case.

As a solution to this problem, a device mostly described in technical literature as "brake assistance" is proposed. To put it concisely, this brake assistance ensures that in an emergency braking situation, i.e. when the input element is moved very quickly a relatively long way in the actuating direction, the brake booster provides its maximum auxiliary force. Early brake assistance solutions employed an electromagnet which, after identification of an emergency braking situation, independently of the actual input force held the air control valve of a vacuum brake booster in the open position so that the maximum pressure difference between a vacuum chamber and a working chamber and hence the maximum possible auxiliary force was able to build up in the vacuum brake booster. In order to achieve the same effect without an expensive electromagnet, later solutions propose that the previously mentioned thrust piece be supported in an emergency braking situation against the control valve housing so that the hydraulic reaction forces transmitted from the master cylinder back into the brake booster do not retroact upon the input element of the brake booster and hence upon the brake pedal but are taken up by the brake booster. Thus, with a relatively low input and/or actuating force a high output force may be achieved, this being desirable in an emergency braking situation. Solutions of the last-described type are known from the previously mentioned WO 99/26826 and from EP 0 901 950 B1.

The last-mentioned solutions are however mechanically relatively complex and therefore not much less expensive than the likewise mentioned electromagnetic solution.

BRIEF SUMMARY OF THE INVENTION

The underlying object of the invention is therefore to provide a brake booster with brake assist function, which is mechanically simpler and hence less expensive than previously known solutions.

Proceeding from the initially mentioned background art, which effects the supporting of the thrust piece in that by releasably supporting the thrust piece against the control valve housing by means of a coupling element biased by a spring, this object is achieved according to the invention in that the spring and the coupling element are designed as an integral coupling component, which is fastened to the control valve housing. Thus, without impairing the desired function, a markedly reduced complexity of the mechanical construction and hence a perceptible cost reduction is achieved.

According to a preferred development of the invention, the coupling component has a substantially hollow cylindrical shape and concentrically surrounds a valve piston, which is workingly connected to the input element and the thrust piece. Formed on the valve piston, which as a rule is connected directly to the input element, is a valve seat, the so-called atmosphere sealing seat, the opening of which by means of a displacement of the input element in actuating direction leads to a flow of atmospheric pressure into the working chamber of a vacuum brake booster and consequently to the build-up of a boosting force. The arrangement of a hollow cylindrical coupling component around such a valve piston not only saves space but is also functionally advantageous.

In preferred forms of construction of the brake booster according to the invention, the coupling component tapers conically in the direction of the thrust piece. In such embodiements, the coupling component in the region of its conical taper preferably has a plurality of spring tongues biased in a radially inward direction. Given such a form of construction, the spring tongues perform both the spring bias function and the coupling function.

In forms of construction with a coupling component that has spring tongues biased in a radially inward direction, the free ends of the spring tongues preferably cooperate in a sliding manner with a detent sleeve, which is disposed displaceably on the valve piston. The one end of the detent sleeve is in said case designed so that it may be supported against the valve piston, while the other detent sleeve end is designed so that it may be supported against the thrust piece. In order that such a detent sleeve may be locked against return displacement relative to the control valve housing and at the same time be supported against the control valve housing, with the result that the thrust piece supported against the detent sleeve is also locked and supported in the same manner, the detent sleeve preferably comprises a detent collar, behind which the free ends of the spring tongues latch when a predetermined displacement of the thrust piece relative to the control valve housing in the direction of the output element is exceeded. In a simple form of construction, the detent collar may be formed e.g. by a stepped taper of the outside diameter of the detent sleeve.

In another form of construction, the detent collar is a projection projecting in a radially outward direction from the outer peripheral surface of the detent sleeve and preferably designed circumferentially as an annular collar. The detent sleeve and the thrust piece, which have been described here as two separate parts, may alternatively be integrally connected to one another. Also, the detent sleeve need not be disposed on the valve piston but may adjoin the valve piston in actuating direction, i.e. be disposed between the valve piston and the thrust piece and, if desired, formed integrally with the thrust piece. The "detent sleeve" then also need no longer be a sleeve but may be made of solid material like the thrust piece.

In a preferred form of construction of the brake booster according to the invention, in order to be able to release the previously described latching state there is displaceably disposed on the valve piston a decoupling sleeve, of which one end facing the input element is designed to be supportable against a transverse locking bar connected to the valve piston and the other end is designed, upon a displacement of the control valve housing relative to the decoupling sleeve in the direction of the input element, to come into contact with the coupling component and press the free ends of the spring tongues radially outwards in order to release the latter from their latched position behind the detent collar of the detent sleeve. In order to be able to carry out this task, the decoupling sleeve has to be of a sufficiently rigid construction, i.e. it has to be easily able to withstand the radially inwardly directed spring bias of the coupling component. The end of the decoupling sleeve facing the coupling component is preferably annular, if the coupling component is hollow cylindrical.

In all forms of construction of the brake booster according to the invention, the coupling component is preferably made of spring steel. It is thereby guaranteed that the coupling component, on the one hand, generates the desired spring bias and, on the other hand, is capable of transmitting the supporting forces to the control valve housing without itself being destroyed.

For the stationary anchoring of the coupling component in the control valve housing, the coupling component at its end facing the input element is preferably provided with a radially outwardly projecting flange, which may engage behind a projection formed in the control valve housing, so that the flange is fixed in the control valve housing by means of a snap ring, which is inserted into an adjacent groove of the control valve housing. In order to increase the stability of the coupling component vis-à-vis a deformation brought about by transmission forces, a portion of the coupling component extending from the radially outwardly projecting flange in the direction of the free end of the coupling component has an outside diameter, which apart from normal tolerances corresponds to the inside diameter of a bore of the control valve housing, in which bore said portion of the coupling component is disposed. This allows the said portion to be supported against the wall of the bore in the control valve housing without leading to a deformation of the coupling component. Given such a construction, the wall thickness of the said portion of the coupling component need not be made as thick as would otherwise be necessary.

Other advantages of this invention will become apparent to those skilled in the art from the following detailed description of the preferred embodiment, when read in light of the accompanying drawings.

BRIEF DESCRIPTION OF THE SEVERAL VIEWS OF THE DRAWING

FIG. 1 shows in longitudinal section the presently relevant part of a vacuum brake booster, generally denoted by 10, for a motor vehicle hydraulic brake system. The brake booster 10, downstream of which a master brake cylinder (not shown here) is connected, has a housing 12 of sheet-metal shells, only the beginning of which is shown in the drawing and in which a non-illustrated movable wall separates and seals off a working chamber 14 from a vacuum chamber 16.

DETAILED DESCRIPTION OF THE INVENTION

The movable wall is firmly connected to a control valve housing 18, which extends in a sliding, displaceable manner in a tubular end portion 20 of the brake booster housing 12. The control valve housing 18 is part of a control valve 22 for selectively connecting either the working chamber 14 to the ambient atmosphere or the vacuum chamber 16 to the working chamber 14.

During operation of the brake booster 10 the vacuum chamber 16 is constantly connected to a vacuum source, e.g. the intake manifold of an internal combustion engine, in order to continuously maintain in the vacuum chamber a pressure lower than the ambient atmosphere. In an initial state of the brake booster 10, the working chamber 14 is also evacuated to this lower pressure. If the control valve 22 is then actuated by applying an input force F to an input element 24, the input element 24 and a valve piston 26 workingly connected thereto are displaced into the brake booster housing 12, i.e. to the left in the drawing. An annular atmosphere sealing seat 28 formed on the valve piston 26 therefore lifts off an annular valve sealing element 30 and therefore allows atmospheric pressure to flow through a filter 32 into the control valve housing 18 and past the now open atmosphere sealing seat 28 into the working chamber 14. At the movable wall separating the working chamber 14 from the vacuum chamber 16 a pressure difference therefore builds up, and the force resulting therefrom then endeavours to displace the movable wall and the control valve housing 18 firmly connected thereto to the left. This force is the auxiliary or servo force generated by the brake booster 10. It is delivered via a rubber-elastic output element 34, which is disposed in a chamber in an end portion of the control valve housing 18 facing the master cylinder, to the master cylinder, e.g. with the aid of an only partially illustrated tappet 36.

Disposed in an axially displaceable manner between the rubber-elastic output element 34 and the valve piston 26 is a thrust piece 38, via which the input force F applied to the input element 24 is transmitted to the output element 34. In the output element 34, therefore, the input force F applied by a user and the auxiliary force generated by the brake booster 10 are combined and then delivered to the master cylinder.

When the user releases the brake, the valve piston 26 moves back to the right, strikes against the valve sealing element 30 and presses it slightly to the right so that the valve sealing element 30 lifts off an annular vacuum sealing seat 40 formed in the control valve housing 18, with the result that a connection is established between the vacuum chamber 16 and the working chamber 14 and the working chamber 14 is evacuated once more in order to re-establish the initial state needed at the start of a braking operation. This general function of a vacuum brake booster is well known to experts in this field and therefore requires no further explanation.

To provide a so-called brake assist function, in the control valve 22 further components are disposed, which are described in detail below. Here, "brake assist function" means that the brake booster 10 in an emergency braking situation provides a user with the maximum brake power assistance, i.e. the maximum auxiliary force, even if the user does not maintain a corresponding input force F or at any rate does not maintain it throughout the braking operation. During a normal braking operation, as described, the valve piston 26 is displaced relative to the control valve housing 18. On an end portion 42 of the valve piston 26 facing the output element 34 and having a reduced diameter a detent sleeve 44 having a radially outwardly projecting annular flange 45 is disposed in a floating manner, which detent sleeve in contrast to the form of construction illustrated here may alternatively be formed integrally with the thrust piece 38. The end of the detent sleeve 44 facing the input element 24 is supported against a step 46 formed on the valve piston 26 by the diameter reduction, so that the detent sleeve 44 upon an actuation of the brake booster 10 is driven by the valve piston 26 to the left. The opposite, other end of the detent sleeve 44 terminates flush with the associated end of the valve piston 26 and, like this end, is in contact with the thrust piece 38.

Formed on the outer peripheral surface of the detent sleeve 44 is a detent collar 48, which in the present case is continuous in peripheral direction and the function of which is described in greater detail below.

Disposed in a bore 50 of the control valve housing 18 is a generally hollow cylindrical coupling component 52, which in the present case is made of spring steel. At its end facing the input element 24 the coupling component 52 has a radially outwardly projecting flange 54, which engages behind a stepped projection 56 in the bore 50. Formed adjacent to the projection 56 in the wall of the bore 50 is an annular groove 58, into which is inserted a snap ring 60, which fastens the flange 54 of the coupling component 52 in the control valve housing 18.

Adjoining the flange 54 is a portion 62 of the coupling component 52, which portion extends in the direction of the output element 34 and has an outside diameter, which apart from normal tolerances corresponds to the inside diameter of the bore 50. With this portion 62 the coupling component 52 may be supported against the wall of the bore 50. The coupling component 52 tapers conically towards its free end. The region of the conical taper is formed by a plurality of spring tongues 64, which are biased in a radially inward direction and separated from one another by non-illustrated slots and the free ends of which rest on the surface of the detent collar 48.

A decoupling sleeve 68 is disposed in an axially displaceable manner on a portion 66 of the valve piston 26 and may be supported by its, in the present case, flange-like end facing the input element 24 against a transverse locking bar 70, which is connected to the valve piston 26 and is axially displaceable in a groove 71 of the valve piston 26. The transverse locking bar 70 is used to define an initial position of the control valve 22 in that its free end in the initial position is supported against a stop 72 of the brake booster housing 12. This initial position is also referred to as the LTF position (lost-travel-free position). From this initial position, the brake booster 10 is actuable without lost travel.

As already explained, during a normal braking operation the valve piston 26 is displaced relative to the control valve housing 18, thereby opening the atmosphere sealing seat 28, and in said case drives the detent sleeve 44. Both the detent sleeve 44 and the valve piston 26 press upon the thrust piece 38, which is likewise displaced relative to the control valve housing 18 and penetrates into the rubber-elastic output element 34. The spring tongues 64, which in the initial state shown in the drawing rest on the annular free end of the decoupling sleeve 68, in said case retain the decoupling sleeve 68 and hence the transverse locking bar 70 accommodated in a floating manner in the groove 71. By virtue of the build-up of the corresponding auxiliary force in the brake booster 10, the control valve housing 18 follows and the transverse locking bar 70 detaches itself from the stop 72 on the brake booster housing 12. If a user of the brake booster 10 does not further increase the input force F, a state of equilibrium associated with the respective braking intensity sets in, in which the atmosphere sealing seat 28 once more lies against the valve sealing element 30. During such a normal braking operation, the surface of the detent collar 48 only moves to and fro under the free ends of the spring tongues 64 because the relative displacement of the detent sleeve 44 during a normal braking operation is smaller than the extension of the surface of the detent collar 48 in axial direction.

It is only when the displacement of the valve piston 26 and hence of the detent sleeve 44 relative to the control valve housing 18 is greater and exceeds a predetermined value, as is the case e.g. during an emergency braking operation, that the surface of the detent collar 48 is moved away from the region under the free ends of the spring tongues 64 and the spring tongues 64 by virtue of their radially inwardly acting spring bias press the decoupling sleeve 68 slightly back in the direction of the input element 24, i.e. to the right in the drawing, with the result that the transverse locking bar 70 is also correspondingly displaced in the groove 71 in the valve piston 26. The free ends of the spring tongues 64 snap behind the detent collar 48 and therefore couple the detent sleeve 44 substantially rigidly to the control valve housing 18. The effect of this coupling is that now all of the reaction forces retroacting from the hydraulic brake system no longer act upon the valve piston 26 and hence via the input element 24 upon the brake pedal but are introduced via the thrust piece 38, the detent sleeve 44 and coupling component 52 into the control valve housing 18. This means that all of the reaction forces are absorbed by the brake booster 10 alone, unless the user of the brake booster 10 presses upon the input element 24 powerfully enough for the valve piston 26 to rest against the thrust piece 38. In this state, the atmosphere sealing seat 28 may therefore be held open without the user of the brake booster 10 having to overcome significant counterforces. In other words, this state corresponds to a change of the force transmission ratio of the brake booster 10 towards infinity.

The maximum possible displacement of the valve piston 26 relative to the control valve housing 18 is defined by the axial distance of the annular flange 45 of the detent sleeve 44 from the base of the bore 50. This distance is smaller than the axial extension of the groove 71 in the valve piston 26.

When a user of the brake booster 10 wishes to terminate an emergency braking operation, in the course of which the described rigid coupling of the thrust piece 38 to the control valve housing 18 has occurred, he reduces the input force F exerted upon the input element 24 in a corresponding manner, whereupon the valve piston 26 separates from the thrust piece 38, the atmosphere sealing seat 28 is reapplied against the valve sealing element 30 and the latter shifts counter to actuating direction slightly to the right, with the result that the vacuum sealing seat 40 lifts off the valve sealing element 30 and a connection is established between the working chamber 14 and the vacuum chamber 16. As a result of this connection, the pressure difference at the non-illustrated movable wall of the brake booster 10 is reduced and the control valve housing 18 moves back to the right. As soon as the transverse locking bar 70 is supported against the stop 72, the decoupling sleeve 68 is also unable to move further to the right so that, upon a further return stroke of the control valve housing 18, the annular free end of the decoupling sleeve 68 strikes from the inside against the spring tongues 64 and pushes them radially outwards. In other words, the inner surfaces of the spring tongues 64 run onto the end of the decoupling sleeve 68 and, upon a further return motion of the control valve housing 18, are then inevitably pushed radially outwards. The latching state is thereby released and the surface of the detent collar 48 moves once more to a point under the free ends of the spring tongues 64.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Brake booster, in particular for motor vehicles, having a control valve for controlling the boosting force generated by the brake booster, which control valve comprises a control valve housing, an input element, an output element and a thrust piece, which is disposed between the input element and the output element and acts upon the output element and which in dependence upon a relative movement between the thrust piece and the control valve housing caused by the input element is supported releasably against the control valve housing by means of a coupling element biased by a spring,
wherein the spring and the coupling element are designed as an integral coupling component, which is fastened to the control valve housing.

2. Brake booster according to claim 1,
wherein the coupling component has a substantially hollow cylindrical shape and concentrically surrounds a valve piston, which is workingly connected to the input element and the thrust piece.

3. Brake booster according to claim 1,
wherein the coupling component tapers conically in the direction of the thrust piece.

4. Brake booster according to claim 3,
wherein the coupling component in the region of its conical taper has a plurality of spring tongues biased in a radially inward direction.

5. Brake booster according to claim 4,
wherein the free ends of the spring tongues cooperate in a sliding manner with a detent sleeve, which is disposed displaceably on the valve piston and of which one end is designed to be supported against the valve piston and the other end is designed to be supported against the thrust piece.

6. Brake booster according to claim 5,
wherein the detent sleeve comprises a detent collar, behind which the free ends of the spring tongues latch when a predetermined displacement of the thrust piece relative to the control valve housing in the direction of the output element is exceeded.

7. Brake booster according to claim 4,
wherein displaceably disposed on the valve piston is a decoupling sleeve, of which one end facing the input element is designed to be supported against a transverse locking bar connected to the valve piston and the other end is designed, upon a displacement of the control valve housing relative to the decoupling sleeve in the direction of the input element, to come into contact with the coupling component and press the free ends of the spring tongues radially outwards in order to release the latter from their latched position behind the detent collar of the detent sleeve.

8. Brake booster according to claim 1,
wherein the coupling component is made of spring steel.

9. Brake booster according to claim 1,
wherein the coupling component at its end facing the input element has a radially outwardly projecting flange, which engages behind a projection formed in the control valve housing and is held stationary in the control valve housing by means of a snap ring, which engages into an adjacent groove of the control valve housing.

10. Brake booster according to claim 9,
wherein a portion of the hollow cylindrical coupling component extending from the radially outwardly projecting flange in the direction of the free end has an outside diameter, which apart from normal tolerances corresponds to the inside diameter of a bore of the control valve housing, in which bore the portion of the coupling component is disposed.

* * * * *